US007996347B2

(12) United States Patent
Hutson et al.

(10) Patent No.: US 7,996,347 B2
(45) Date of Patent: Aug. 9, 2011

(54) ADAPTIVE INFORMATION TECHNOLOGY SOLUTION DESIGN AND DEPLOYMENT

(75) Inventors: William E. Hutson, Cary, NC (US);
Samuel R. McHan, Jr., Apex, NC (US);
John A. Medicke, Raleigh, NC (US);
Christopher H. L. Wicher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/098,057

(22) Filed: Apr. 4, 2008

(65) Prior Publication Data
US 2009/0254504 A1  Oct. 8, 2009

(51) Int. Cl.
*G06F 17/00* (2006.01)
*G06F 9/44* (2006.01)
*G06N 5/00* (2006.01)
(52) U.S. Cl. .......................................... 706/45; 717/102
(58) Field of Classification Search .................. None
See application file for complete search history.

(56) References Cited

U.S. PATENT DOCUMENTS

| | | | | |
|---|---|---|---|---|
| 6,167,564 | A * | 12/2000 | Fontana et al. | 717/104 |
| 7,162,427 | B1 * | 1/2007 | Myrick et al. | 705/348 |
| 7,278,134 | B2 * | 10/2007 | Ricke | 717/123 |
| 7,373,635 | B2 * | 5/2008 | Guyette | 717/120 |
| 7,487,173 | B2 * | 2/2009 | Medicke et al. | 1/1 |
| 7,631,299 | B2 * | 12/2009 | Kannenberg | 717/121 |
| 7,865,380 | B2 * | 1/2011 | Ernest et al. | 705/7.11 |
| 7,885,793 | B2 * | 2/2011 | Padmanabhan | 703/2 |
| 2004/0230464 | A1 * | 11/2004 | Bliss et al. | 705/7 |
| 2006/0150143 | A1 * | 7/2006 | Andreev et al. | 717/106 |

OTHER PUBLICATIONS

Curtis, et al.; "A Field Study of the Software Design Process for Large Systems"; 1988; Communications of the ACM; pp. 1268-1287.*
Walz, et al.; "Inside a Software Design Team: Knowledge Acquisition, Sharing, and Integration"; 1993; Communications of the ACM, vol. 36, No. 10; pp. 63-77.*
Hevner, et al.; "Design Science in Information Systems Research"; 2004; MIS Quarterly, vol. 28, No. 1; pp. 75-105.*
Kent Beck and Cynthia Andres, Extreme Programming Explained: Embrace Change, Second Edition, Book, 2005, Chapter 11, p. 87, Addison-Wesley, Reading, MA.
Mary Poppendieck and Tom Poppendieck, Implementing Lean Software Development: From Concept to Cash, Book, 2006, Chapter 2, pp. 29-30, Addison-Wesley, Reading, MA.
Ken Schwaber and Mike Beedle, Agile Software Development with SCRUM, Book, 2001, Chapter 5, pp. 94-95, Prentice Hall Pub, Upper Saddle River, NJ.

* cited by examiner

*Primary Examiner* — Michael B Holmes
*Assistant Examiner* — Stanley K Hill
(74) *Attorney, Agent, or Firm* — Lee Law, PLLC; Christopher B. Lee

(57) ABSTRACT

A set of information technology solution alternatives is generated for an enterprise organization. The information technology solution alternatives are evaluated within an automated architectural framework based upon one or more information technology evaluation metrics. An automated incremental solution deployment strategy is created based upon the evaluated plurality of information technology solution alternatives. An information technology solution is selected from the set of information technology solution alternatives for deployment based upon the automated incremental solution deployment strategy.

21 Claims, 9 Drawing Sheets

ADAPTIVE INFORMATION TECHNOLOGY SOLUTION DESIGN AND DEPLOYMENT

BACKGROUND OF THE INVENTION

1. Field of the Invention

The present invention relates to systems and methods for development and deployment of information technology solutions. More particularly, the present invention relates to adaptive information technology solution design and deployment.

2. Related Art

In the field of Information Technology (IT), a solution is commonly understood as an aggregation of distinct software and hardware entities configured to meet a set of particular business requirements. In contrast to computer programs and applications (which typically provide a closed set of integrated functions) and in contrast to a software product (which is generally a unitary purchasable entity), an IT solution may only satisfy the processing requirements through an aggregation of separate programs and products. As a result, most solutions are composed of multiple individual computer products arranged and configured for a particular set of customer needs and constraints.

Conventional IT solution methods are rooted in software development paradigms. One of the most widely known and applied models used for large-scale software development is called the waterfall model. The waterfall model follows a progressive, sequential approach to solution development using a series of connected and conditional phases, where each phase is conditioned upon completion of the previous phase.

BRIEF SUMMARY OF THE INVENTION

The subject matter described herein provides for adaptive information technology (IT) solution design and deployment. Granular development and deployment of IT solutions is enabled by systems and methods that provide feedback at multiple phases of an IT solution development process. A core IT solution evolves from a set of shared capabilities amongst a set of possible IT solutions. Decisions regarding selection of a specific IT solution are postponed to facilitate proof of the shared capabilities while specific requirements are further refined. Customer and maintenance department feedback may be solicited early and repeatedly during the IT solution development process to allow selection of a specific IT solution to be tailored to the realities of the customer's often-changing requirements. The selected IT solution may be rapidly deployed after selection of the specific solution while the customer's requirements are still relevant. Accordingly, IT solution providers may be responsive to customer requirements as the requirements evolve and the selected IT solution may evolve with the customer requirements.

A method includes generating a plurality of information technology solution alternatives for an enterprise organization, evaluating the plurality of information technology solution alternatives within an automated architectural framework based upon at least one information technology evaluation metric, creating an automated incremental solution deployment strategy based upon the evaluated plurality of information technology solution alternatives, and selecting an information technology solution from the plurality of information technology solution alternatives for deployment based upon the automated incremental solution deployment strategy.

A system includes a knowledge acquisition module adapted to generate a plurality of information technology solution alternatives for an enterprise organization, and evaluate the plurality of information technology solution alternatives within an automated architectural framework based upon at least one information technology evaluation metric. A construction automation module adapted to create an automated incremental solution deployment strategy based upon the evaluated plurality of information technology solution alternatives and select an information technology solution from the plurality of information technology solution alternatives for deployment based upon the automated incremental solution deployment strategy, and a deployment automation module adapted to deploy the selected information technology solution.

An alternative system includes a database adapted to store an automated architectural framework, a knowledge base, and a context base. A process module includes a knowledge acquisition module adapted to generate a plurality of information technology solution alternatives for an enterprise organization, store the plurality of information technology solution alternatives to the knowledge base within the database, evaluate the plurality of information technology solution alternatives within the automated architectural framework based upon at least one information technology evaluation metric, and update the plurality of information technology solution alternatives for the enterprise organization based upon feedback. The process module also includes a construction automation module adapted to create an automated incremental solution deployment strategy based upon the evaluated plurality of information technology solution alternatives, store the automated incremental solution deployment strategy to the context base within the database, and select an information technology solution from the plurality of information technology solution alternatives for deployment based upon the automated incremental solution deployment strategy; a deployment automation module adapted to deploy the selected information technology solution based upon the automated incremental solution deployment strategy; and a support and problem determination automation module adapted to identify at least one of a predicted problem and an actual problem, wherein the predicted problem is based upon further evaluation of the plurality of information technology solution alternatives within the automated architectural framework and the actual problem is based upon evaluation of the deployed information technology solution, and provide at least one of the predicted problem and the actual problem as the feedback to the knowledge acquisition module.

A computer program product includes a computer useable medium including a computer readable program. The computer readable program when executed on a computer causes the computer to generate a plurality of information technology solution alternatives for an enterprise organization, evaluate the plurality of information technology solution alternatives within an automated architectural framework based upon at least one information technology evaluation metric, create an automated incremental solution deployment strategy based upon the evaluated plurality of information technology solution alternatives, and select an information technology solution from the plurality of information technology solution alternatives for deployment based upon the automated incremental solution deployment strategy.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for adaptive information technology (IT) solution design and deployment. Granular development and deployment of IT solutions is enabled by systems and methods that provide feedback at multiple phases of an IT solution development process. A core IT solution evolves from a set of shared capabilities amongst a set of possible IT solutions. Decisions regarding selection of a specific IT solution are postponed to facilitate proof of the shared capabilities while specific requirements are further refined. Customer and maintenance department feedback may be solicited early and repeatedly during the IT solution development process to allow selection of a specific IT solution to be tailored to the realities of the customer's often-changing requirements. The selected IT solution may be rapidly deployed after selection of the specific solution while the customer's requirements are still relevant. Accordingly, IT solution providers may be responsive to customer requirements as the requirements evolve and the selected IT solution may evolve with the customer requirements.

Figure 1:
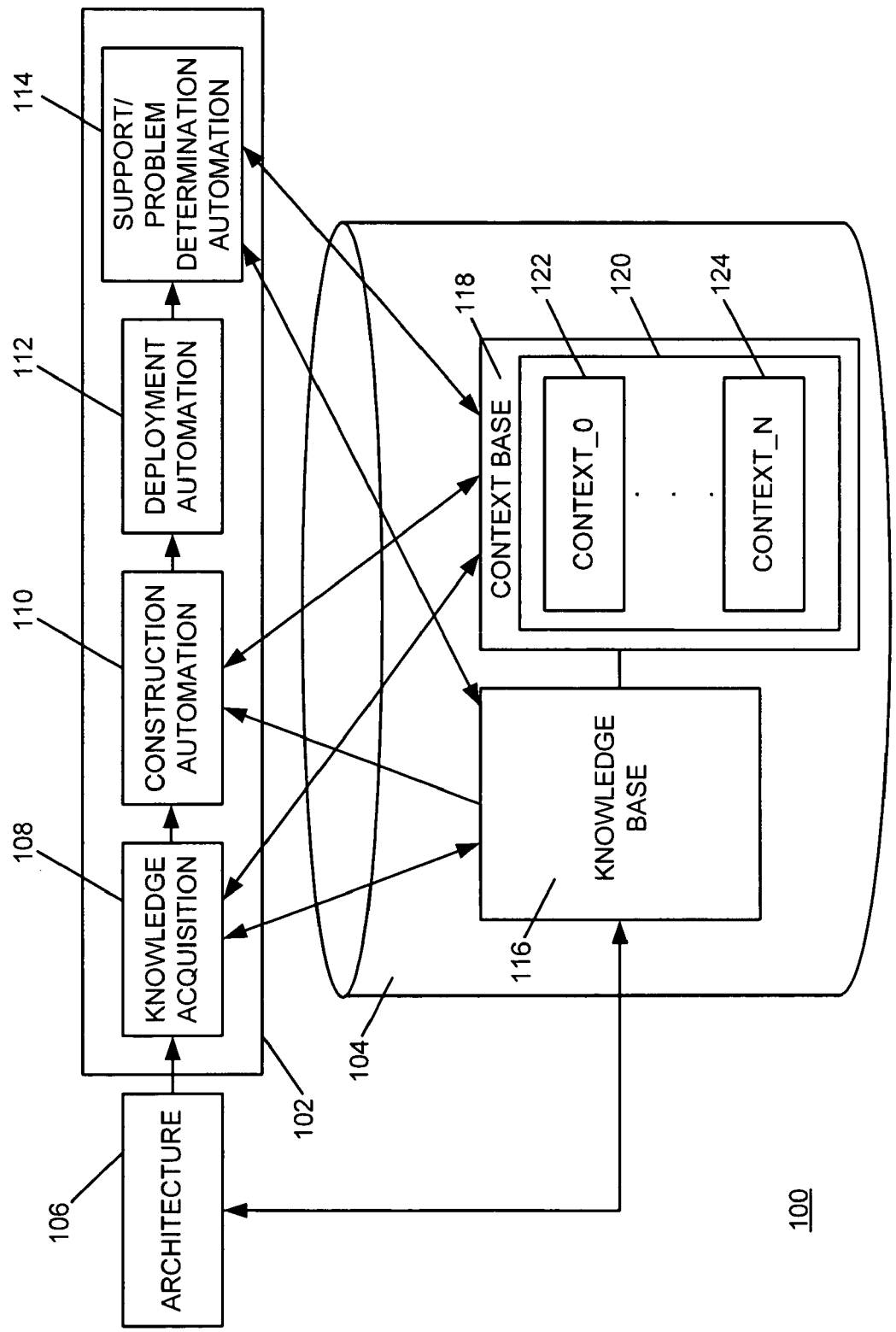
FIG. 1 illustrates a block diagram of an example of an implementation of an IT solution development system for adaptive information technology (IT) solution design and deployment according to an embodiment of the present subject matter.

FIG. 1 illustrates a block diagram of an example of an implementation of an IT solution development system 100 for adaptive IT solution design and deployment according to the present subject matter. The IT solution development system 100 facilitates IT solution development and deployment of incremental, evolutionary changes to an IT solution infrastructure in a coherent and adaptive manner by improving information flow between requirements groups, development groups, and deployment groups. The IT solution development system 100 improves IT solution development processes whether operating within the context of an existing IT solution or during an initial deployment of an IT solution. The IT solution development system 100 facilitates rapid IT solution design, IT solution development, and actual IT solution deployment by implementing a nimble and cross-functional approach to these processes. By facilitating coherent, adaptive, incremental, evolutionary changes for an IT solution during the development and deployment phases, the IT solution development system 100 operates to lower risk associated with IT solution implementation and changes. Additionally, client relationships may be improved by facilitating better communication between client requirement development processes and IT development and deployment processes.

Within FIG. 1, a process module 102 and a database 104 are illustrated. The process module 102 includes several sub-modules that will be described in more detail below. The database 104 includes several component storage elements that will also be described in more detail below. As a preliminary matter, it should be noted that while the IT solution development system 100 is shown with a single process module 102 and a single database 104, this is for ease of illustration purposes only. The process module 102 and the database 104 may each be implemented in a distributed fashion and/or networked or otherwise interconnected without departure from the scope of the present subject matter. Additionally, the use of the database 104 to represent storage capabilities within the IT solution development system 100 is for ease of illustration purposes, as any other type of storage device(s) may be used without departure from the scope of the present subject matter.

A technology-neutral architectural framework (architecture) 106 provides input to the process module 102. Within the process module 102, a knowledge acquisition module 108, a construction automation module 110, a deployment automation module 112, and a support/problem determination module 114 perform integrated, adaptive operations for the evolution of an IT solution. Within the database 104, a knowledge base 116 and a context base 118 provide for storage and sharing of information and contextual information throughout the IT solution development process. The context base 118 stores and organizes, among other things, a set of possibility contexts 120 as a context_0 122 through a context_N 124. Each of these modules will be described in more detail below.

The architecture 106 defines technology-neutral and technology-specific requirements to facilitate flexible IT solution analysis, development, and deployment activities within the process module 102. The technology-neutral requirements include technology-neutral architectural components and technology-neutral standards. Additionally, the architecture 106 separates technology-neutral elements (e.g., stable, longer-term, and strategic elements) from technology-specific elements (e.g., transient, near-term, and tactical elements). The technology-specific elements include technology-specific IT contexts and technology-specific instantiations of standards. The architecture 106 facilitates opportunity management by allowing late-binding of technical decisions. The architecture 106 also provides an industry model, candidate vendor lists, and definitions for staged deployment/roll-out of solution possibilities. Accordingly, the architecture 106 abstracts a meta-architecture from core architectural considerations and defines an approach to late binding of specific technological aspects of IT solutions.

The architecture 106 also creates an environment for evaluation of a set of possible requirements and possible solutions to accommodate those requirements. As such, the architecture 106 provides a high degree of flexibility and allows decisions to be made as late as possible.

The architecture 106 provides a broad framework for making solution design decisions and for doing solution implementation by ensuring that each new solution deployed meets architectural standards, defined business practices, strategic objectives, and architectural requirements. Accordingly, the architecture 106 defines an ontology for knowledge acquisition. For purposes of the present subject matter, an "ontology" shall be considered any organized arrangement of information, entities, and/or relationships by which analytical processing and/or technical analysis may be performed. This ontology defined by the architecture 106 enables rapid IT solution development within a defined architectural context and within measurable IT solution boundaries.

Prior to addressing the modules within the process module 102, the concept of contexts, such as the context_0 122, will now be described in more detail. A context represents contingent and situational facts or information about an IT solution with varying levels of detail. As such, a context represents at least a portion of an IT solution. For example, an email archiving IT solution context may represent a set of facts or information about that email archiving IT solution. The information may include the general purpose of the email archiving IT solution (e.g., mailbox management, email journaling, etc.), specific configuration elements (e.g., archiving policies, retention policies, etc.), performance or capacity information (e.g., available and used storage, emails processed per hour, etc.), and specific components of the solution (e.g., specific products, patches, etc.). The context may also link to or include contexts from ancillary components like an associated email IT solution employed within an enterprise environment.

Whereas a context represents an instance of an IT solution, permutations and possible variations of the IT solution are embodied within "possibility" contexts. As such, a possibility context represents a model of a permutation of a given solution. The possibility context builds on the characteristics of a context by adding certain constraints or rules to that context. For example, possibility contexts may be generated based upon computations of all possible combinations of products and their product-to-product and product-to-solution compatibility characteristics, capabilities, configurations, and other variables that are available for a given IT solution. These possibility contexts may be incorporated into the set of possibility contexts 120 to facilitate strategic, incremental, and adaptive evolution of IT solutions.

As an example of how to associate the set of permutations of possible IT solutions, any two possibilities represented within a set of possibility contexts may be identified as "compatible," "mutually exclusive," or "tolerant." In this manner, evaluation of IT solution alternatives may be refined and processed to identify opportunities for late binding and other performance improvements. For example, if an email archiving solution works with two types of back-end engines for archiving e-mail which are each considered compatible alternatives, when considered in the context of an email archival IT solution, only one may be selected as the archiving engine. As such, within this specific context they are considered mutually exclusive. However, if the context is changed slightly such that the selected back-end engine is managing data being archived without performing more independent activities, then the back-end engines may once again be considered compatible alternatives.

Based upon this definition of contexts, an IT solution defined by contexts does not need to explicitly and deliberately choose which version of a product that must be used to satisfy a given constraint or requirement. The context expresses a more enduring abstraction that applies to the present IT requirements, as well as to possible future implementations. Another aspect of a context from a methodology perspective is that a context may be applied to the existing IT environment of a customer rather than being limited to requirements for new products, or to just entirely new IT environments.

Certain elements within a context may be time sensitive and may be dynamic and vary over time. These time sensitive elements may be correspondingly represented or modeled over time. For example, a time sensitive elements, such as resource consumption (e.g., processor, memory, storage, network utilization, etc.), may be captured within a context. Trends or variances in the element may be plotted or tracked within the context to identify actual changes over time. Additionally, trends or variances in the element may be extrapolated to anticipate changes over time. Accordingly, solutions may be identified and evaluated within contexts to anticipate changes in technology based upon technology-specific characteristics and/or metrics.

By adopting a context-centric approach, the present subject matter removes limitations of conventional function-centric approaches. Conventional product-level configurations are typically function oriented, with installation tasks and configuration parameters focused on the specific product features being selected. This limits conventional models to lower-level processing of IT solutions.

The present subject matter encapsulates these functional aspects into context-centric views that operate based upon the environmental conditions that the given IT solution operates within. For example, by defining a context to include a requirement for configuring e-mail archiving with attachments and by defining many implementation alternatives as possibility contexts (e.g., permutations) on that context, the IT solution development system 100 abstracts detailed considerations into alternatives that are quantified as compatible, mutually exclusive, or tolerant for analytical purposes. Accordingly, the IT solution development system 100 operates at a layer of abstraction to facilitate analysis and refines IT solutions as new information becomes available and as the knowledge base 116 grows. Context-centric operations will be described in more detail beginning with FIG. 2 below.

With the foundational concept of contexts presented, the modules within the process module 102 will now be described. The knowledge acquisition module 108 operates using the architecture 106 as input. The knowledge acquisition module 108 is programmatically linked to the architecture 106. The knowledge acquisition module 108 provides automated information acquisition, alternative solution generation capabilities, and analytical capabilities for the IT solution development system 100. The knowledge acquisition module 108 analyzes multiple business strategies in parallel, acquires knowledge and information associated with the multiple business strategies, and provides a dynamic output as a set of possibilities (e.g., contexts) for IT solution deployment.

The knowledge acquisition module 108 facilitates knowledge acquisition as a joint activity between line-of-business (LOB) departments and IT departments. In contrast to conventional IT solution development where the LOB creates requirements and then throws them over the wall to the IT department, the IT solution development system 100 facilitates collaborative solution development between the LOB and IT departments. The knowledge acquisition module 108 also supports rapid knowledge discovery by allowing exploration of multi-path IT solution possibilities rather than exploring a single IT solution in response to an initial pass of requirements. Additionally, the knowledge acquisition module 108 supports a structured analysis based on a solution-oriented ontology.

The knowledge acquisition module 108 maps the architecture 106 into a governing ontology, and generates and stores that ontology as the set of possibility contexts 120 to the context base 118 within the database 104. Each of the context_0 122 through the context_N 224 defines a possible IT solution or portion or a possible IT solution that encompasses at least a portion of one of the multiple business strategies. Certain of the contexts within the set of possibility contexts 120 may define common aspects of multiple IT solution possibilities. By defining common aspects within the set of possibility contexts 120, the knowledge acquisition module 108 provides for design, development, and deployment of common aspects of multiple IT solutions before a final IT solution decision is made. In addition, certain of the contexts within the set of possibility contexts 120 may define immediate business requirements, potential business requirements, potential business models, and business strategic initiatives. As such, the set of possibility contexts 120 allows for deployment of immediate and core IT requirements while allowing a decision regarding the final IT solution to be postponed until all common aspects have been deployed, integrated, and tested.

Unlike conventional solution requirements documents that represent a static point-in-time perspective, the set of possibility contexts 120 defines a running view of the solution potentialities that exist, including various perspectives on new business models and opportunities, industry trends, competitor capabilities, and vendor capabilities. The set of possibility contexts 120 leverages knowledge acquisition activity and feeds off of the knowledge base 116.

As a result, the set of possibility contexts 120 enables adaptive and integrated design, development, and deployment activities for IT solutions within the IT solution development system 100. The set of possibility contexts 120 enables evolution of a resulting IT solution from individual contexts, such as the context_0 122, within the set of possibility contexts 120.

The knowledge acquisition module 108 also builds a list of competitors, customers, and vendors in the governing ontology. The knowledge acquisition module 108 identifies information sources and resources, creates a collaboration environment for shared knowledge discovery, creates links to informational sources, and analyzes the information and data obtained for a variety of purposes. For example, the knowledge acquisition module 108 analyzes the information and data obtained to determine which available sources of information technology are capable of meeting requirements expressed within the set of possibility contexts 120. Additionally, the knowledge acquisition module 108 determines what new possible requirements may be discovered from what competitors are doing, what new possible requirements may be discovered from what customers are doing, and what new possible requirements may be discovered from what vendors are offering. The knowledge acquisition module 108 scores each IT possibility according to the defined architecture 106 and standards represented within the architecture 106. The knowledge acquisition module 108 stores the knowledge and information as acquired and generated to the knowledge base 116 within the database 104 and postpones fundamental decision making for the construction automation phase, as will be described in more detail below.

It should be noted that the knowledge base 116 and the context base 118 are integrated and accessible from other modules within the IT solution development system 100. Knowledge within the knowledge base 116 and the set of possibility contexts 120 within the context base 118 may be accessed and modified by other modules within the IT solution development system 100 throughout the design, development, and deployment process. The ability for other modules to access and operate upon the knowledge base 116 and the context base 118 provides multiple feedback paths within the IT solution development system 100 for knowledge sharing and refinement of IT solutions throughout the IT solution development process. As such, processes within the IT solution development system 100 iteratively refine and share information as the process of IT solution deployment progresses. Modules within the IT solution development system 100 iteratively operate to evolve and converge on a final IT solution.

This integration and accessibility of the set of possibility contexts 120 and the knowledge base 116 within the IT solution development system 100 allows established IT departments to rapidly respond to new business models and opportunities that may arise and allows them to support future requirements and scenarios within an adaptive and incremental development framework based upon system, product, configuration, and other constraints. Additionally, as described above, integration of the set of possibility contexts 120 and the knowledge base 116 with other modules within the IT solution development system 100 programmatically supports an ongoing alignment of LOB departments and IT departments.

The construction automation module 110 utilizes the integration and accessibility of the IT solution development system 100 to take as input specific requirements represented within the set of possibility contexts 120 and information from the knowledge base 116. The construction automation module 110 automates the definition of solutions to meet specific requirements by performing a set of tasks based upon its input.

The construction automation module 110 also creates an automated progressive/incremental solution deployment/roll-out strategy for implementation of IT solutions within the IT solution development system 100. The automated incremental solution deployment strategy may be based upon evaluation of a set of information technology solution alternatives, such as the set of possibility contexts 120. For example, the construction automation module 110 maps business requirements to IT requirements through the architecture 106, maps business requirements to possible business system functions, maps IT requirements to patterns of implementation, and selects multiple possible IT implementations based on these patterns.

In addition, the construction automation module 110 runs multiple implementation and/or test scenarios, and costs and scores each scenario. Scoring is performed by evaluation of compliance with standards established in the architecture 106, satisfaction of requirements explicitly stated for the IT project under analysis, and satisfaction of possible related requirements within the set of possibility contexts 120.

The costing and scoring generated by the construction automation module 110 may be stored to the knowledge base 116. The LOB department and the IT department may jointly review the costing and scoring and an implementation approach may be jointly selected. Because of the degree of integration within the IT solution development system 100, the different departments may work together in a cooperative manner to enable compliance with the requirements, capabilities, and constraints of each department.

Within the framework of the IT solution development system 100, many different types of requirements may be evaluated and considered. For example, major IT strategic initiatives, major business strategic initiatives, new business functions, modifications to existing business functions, and many other types of requirements may all be considered during evaluation of IT solution possibilities.

Taking strategic initiatives as a further example, the construction automation module 110 creates an IT solution roadmap that shows a staging of deployment for multiple roll-outs or branches of related IT solution capability. The architecture 106 is updated with the latest IT strategy view of priorities and the set of possibility contexts 120 is updated to reflect additional or modified possible IT solutions. In this manner, the IT solution development system 100 iteratively processes priorities to refine the set of possibility contexts 120. The previous version of the architecture 106 may be archived to the database 104 for architecture progression management purposes. For example, the previous version of the architecture 106 may be stored within the knowledge base 116 and accessed for comparison with a later version of the architecture 106.

Continuing the running example with consideration of tactical solution requirements, the construction automation module 110 may create or modify an implementation plan for a given set of IT requirements. This implementation plan may be embodied in one or more IT solution contexts, such as the context_0 122, within the set of possibility contexts 120. The construction automation module 110 performs tactical analysis using either an existing solution roadmap from a previous iteration of a strategic architecture, such as the architecture 106, or by using a new solution roadmap from the latest iteration of the architecture 106.

The deployment automation module 112 receives the approved implementation of a solution definition from the construction automation module 110. Deployment automation within the deployment automation module 112 is a product of several contexts within the set of possibility contexts 120. For example, if the current context is context_0 122, the relevant elements of the current environment (e.g., context_0 122), the desired solution (e.g., the approved implementation of a solution definition from the set of possibility contexts 120), and the remaining possibilities (e.g., the remaining elements from the set of possibility contexts 120) are all considered during the deployment automation activities.

Additionally, deployment automation performed by the deployment automation module 112 is a function of the current architecture (e.g., specific platforms, software versions, and configuration states, etc.) and policies. Deployment automation is also a function of the desired target state or next state of the architecture. Deployment automation preserves desired future possibilities where possible to increase flexibility of future deployment automation operations.

The deployment automation module 112 provides deployment automation by analyzing pre- and/or co-requisite hardware and software for a given solution. For example, the deployment automation module 112 may determine whether the current database, such as the database 104, is adequate in terms of version and capacity to archive emails within the next solution to be deployed. If a determination is made that the current database is inadequate, a new database may be deployed.

Additionally, the deployment automation module 112 may determine whether the current configuration state for hardware and software is adequate for the next solution to be deployed. For example, if the current database is adequate, the deployment automation module 112 may inspect the current database configuration from the current architecture for the purposes of automating any configuration steps that involve database integration for the next solution to be deployed. The deployment automation module 112 may then automate those configuration steps for database integration.

A desired state of automation may take the form of a machine executable to enable requisite checking, deployment, and deployment-time configuration of software stacks on multiple hardware platforms. However, technical limitations or lack of necessary detail within the current architecture may limit automation in certain instances. For example, an email archiving solution may need an administrator to configure certain access controls that are driven by external entities and bound by limited time frames. These types of configurations and configuration elements may not be reflected within the architecture or set of possibilities. In such a situation, the deployment automation module 112 generates written instructions, either electronically or otherwise, to instruct an integrator or administrator for manual execution of configuration tasks for any non-automated tasks.

More specifically, a set of plug-ins called "deployment descriptors" (e.g., what to install, where to install it, etc.) and "configuration descriptors" (e.g., specific configuration values that affect the operation of the software and/or hardware) may be generated with pre-populated values based on the current architecture and policies. For example, pre-populated values for the current architecture may include a location of the database 104 and other architectural information. Pre-populated values for policies may include password rules and other policy-based information.

These descriptors are provided to the deployment automation module 112 as input. The deployment automation module 112 produces a run-time executable and any associated manual instructions as output. Together, the run-time executable and the associated manual instructions represent a sequence of operations for deployment of the desired solution.

The support/problem determination module 114 provides feedback for actual deployment issues, predicts potential deployment issues, and performs problem avoidance activities. The support/problem determination module 114 leverages contexts and associated possibilities to facilitate problem avoidance. Each context may be modeled for problem avoidance by establishing threshold criteria beyond which performance impacts or other problems may be realized. For example, if the set of possibilities represented within a possibility context signals a performance impact to an email server when setting up email journaling, then this negative impact on email server performance may be avoided. The support/problem determination module 114 may signal the need to upgrade a given product or to expand a set of resources in advance of any actual performance degradation. In this manner, the support/problem determination module 114 provides preventative problem determination.

The support/problem determination module 114 also operates to perform predictive problem determination by incorporation of time-deltas into the possibilities context. For example, if a deployed IT solution is tracking e-mail storage usage by monitoring archived e-mails over time and the solution context is defined as a function of retention policies and e-mail volume, then an unplanned increase in e-mail volume usage may be used to trigger the installation of more storage devices prior to realization of any actual storage impacts. Accordingly, the support/problem determination module 114 operates using the solution context as a governing problem determination mechanism.

As described above, there are many feedback paths provided within the IT solution development system 100. Problem determination, problem prediction, and problem avoidance information are also fed back to the knowledge base 116 to facilitate increased coherence throughout the IT solution development process. Contexts may be modified and new contexts may be generated within the set of possibility contexts 120 and the IT solution may again be optimized based upon the latest information.

Figure 2:
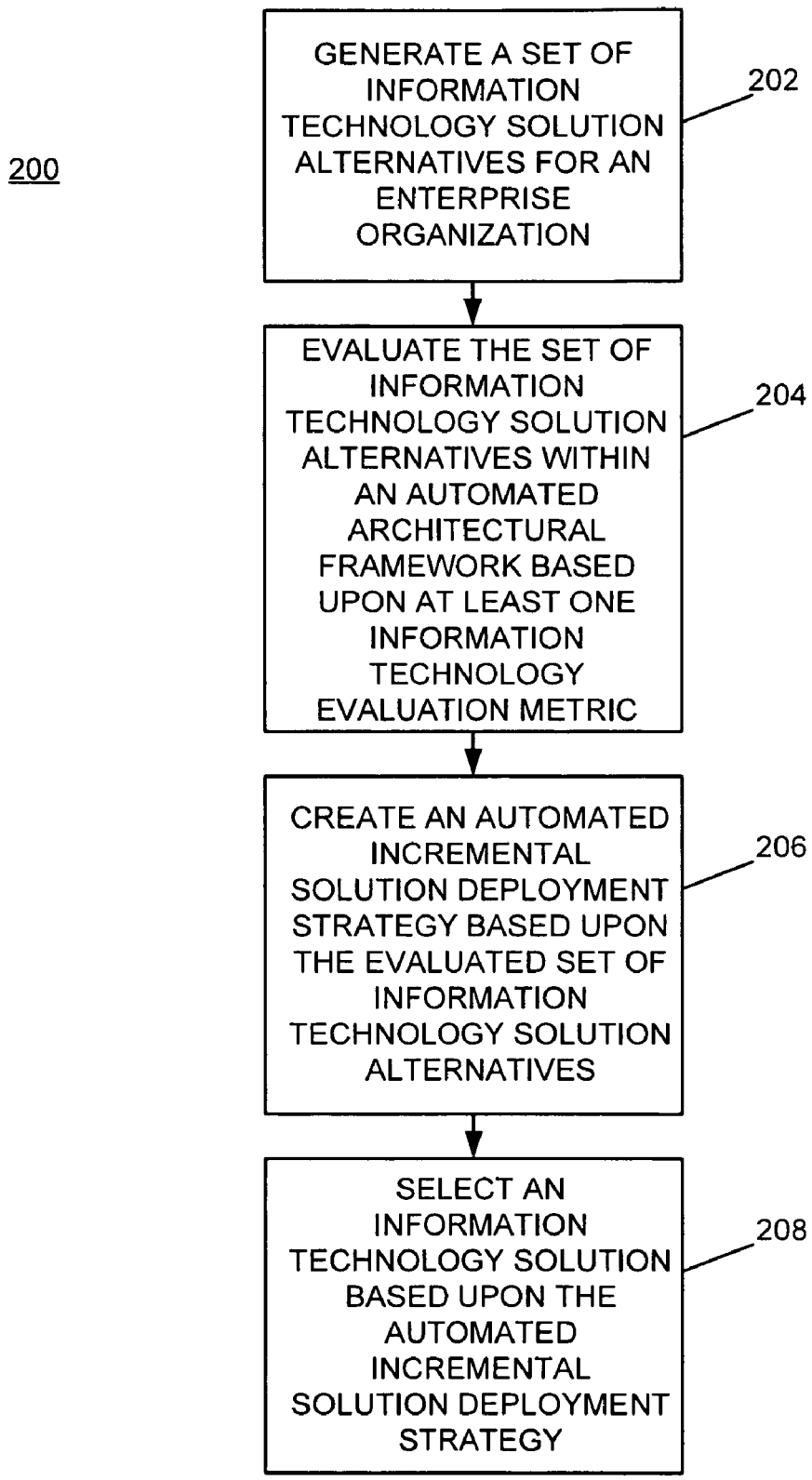
FIG. 2 illustrates a flow chart of an example of an implementation of an automated solution generation process that may be executed within an IT solution development system for adaptive IT solution design and deployment according to an embodiment of the present subject matter.

FIG. 2 illustrates a flow chart of an example of an implementation of an automated solution generation process 200 that may be executed within the IT solution development system 100 for adaptive IT solution design and deployment according to the present subject matter. At block 202, the process 200 generates a set of IT solution alternatives for an enterprise organization. For example, the set of possibility contexts 120 may be generated by the knowledge acquisition module 108.

At block 204, the process 200 evaluates the set of IT solution alternatives within an automated architectural framework based upon at least one information technology evaluation metric. For example, the architecture 106 may be used to evaluate the set of possibility contexts 120 based upon an information technology evaluation metric such as available e-mail server systems.

At block 206, the process 200 creates an automated incremental solution deployment strategy based upon the evaluated set of IT solution alternatives. For example, the construction automation module 110 may identify an incremental solution deployment strategy for implementation of IT solutions within the IT solution development system 100.

At block 208, the process 200 selects an IT solution based upon the automated incremental solution deployment strategy. For example, the construction automation module 110 may select the context_0 122 based upon the set of possibility contexts 120.

Figure 3A:
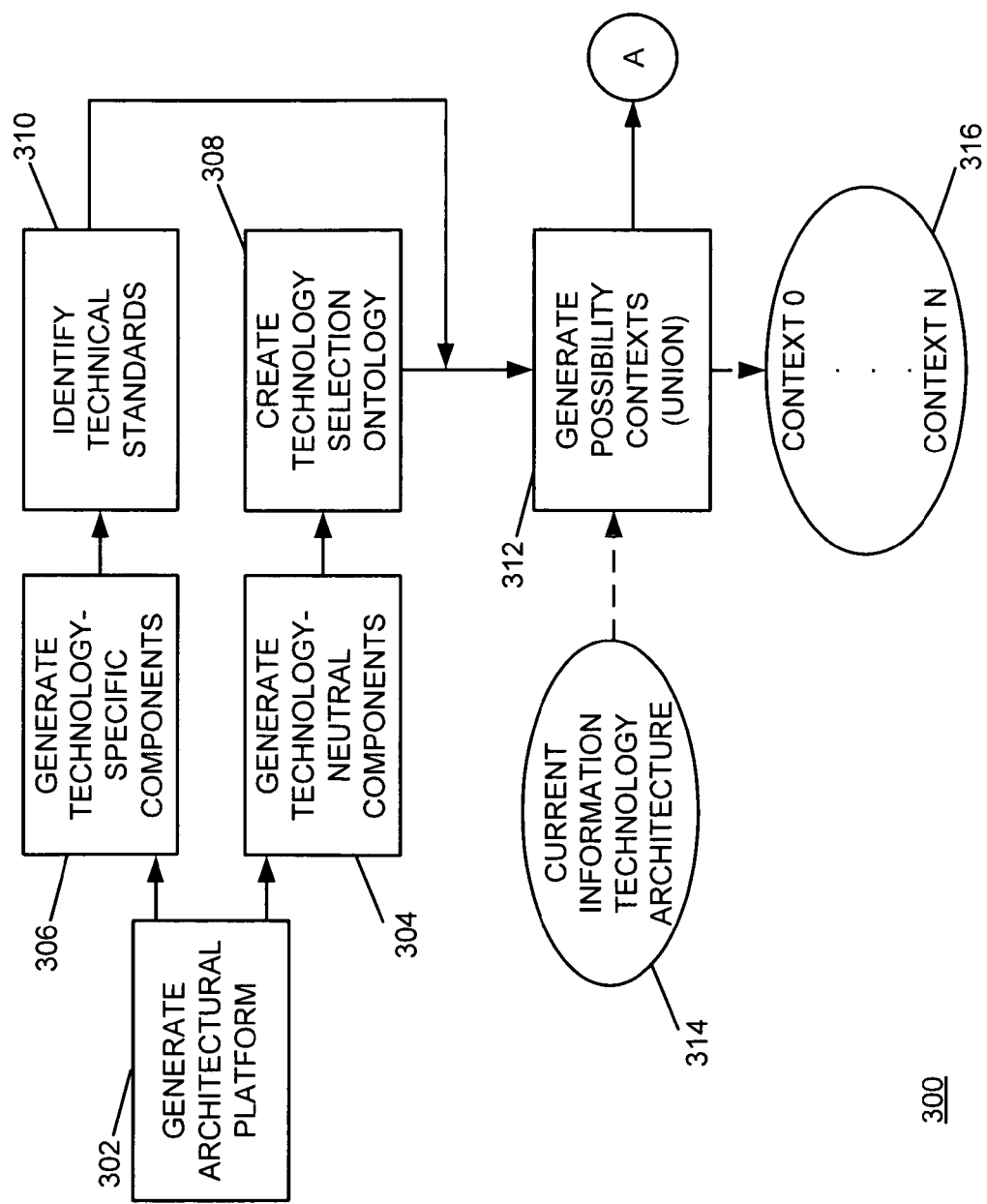
FIG. 3A illustrates a first portion of a flow chart of an example of an implementation of an automated solution generation process that may be executed within an IT solution development system for adaptive IT solution design and deployment according to an embodiment of the present subject matter.

FIGS. 3A-3E illustrate a flow chart of an example of an implementation of an automated solution generation process 300 that may be executed within the IT solution development system 100 for adaptive IT solution design and deployment according to the present subject matter. FIG. 3A illustrates initial processing within the process 300. At block 302, the process 300 generates an architectural platform, such as the architecture 106 of FIG. 1. The process 300 generates technology-neutral components and technology-specific components at blocks 304 and 306, respectively.

It should be noted that while certain of the process elements are shown to operate concurrently and/or in parallel, this should not be considered limiting as other process elements within the process 300 or any other process associated with the present subject matter may also operate concurrently and/or or in parallel without departure from the scope of the present subject matter.

The process 300 creates a technology-selection ontology and identifies technical standards at blocks 308 and 310, respectively. At block 312, the process 300 receives as input a representation of the current information technology architecture 314 and generates a union of the current architecture and the identified technical standards based upon the technology-selection ontology as a set of possibility contexts 316. The set of possibility contexts 316 may include the set of possibility contexts 120 of FIG. 1 and may be stored to the database 104 within the context base 118.

Figure 3B:
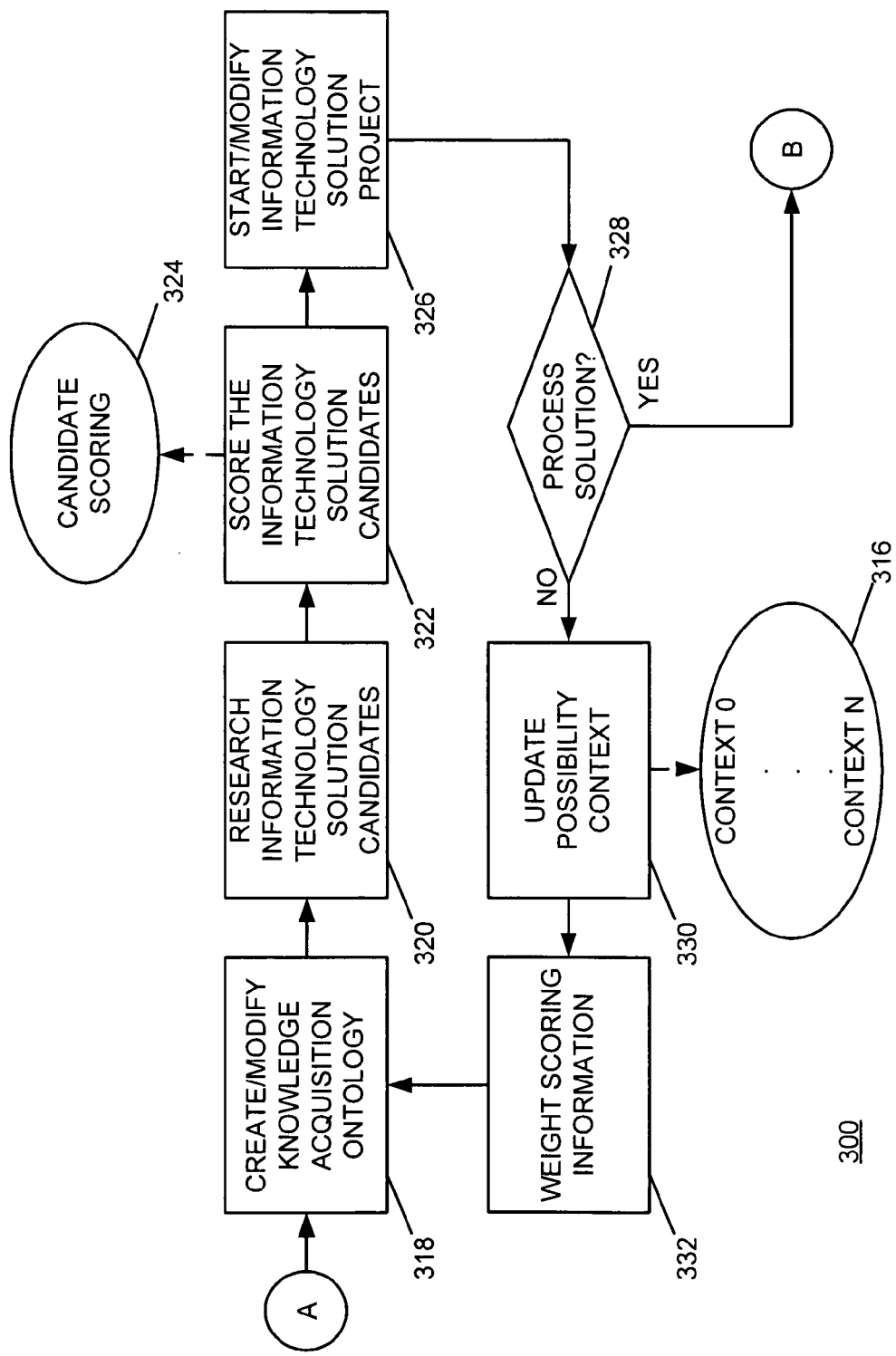
FIG. 3B illustrates a second portion of a flow chart of an example of an implementation of an automated solution generation process that may be executed within an IT solution development system for adaptive IT solution design and deployment according to an embodiment of the present subject matter.

FIG. 3B illustrates additional processing associated with the automated solution generation process 300 for knowledge acquisition. At block 318, the process 300 creates a knowledge acquisition ontology for use in refining IT solution development. As described above and as will be described in more detail below, multiple feedback paths exist within the IT solution development system 100. Some of these feedback paths are depicted within the process 300 and within other example processes. Accordingly, the knowledge acquisition ontology may also be modified at block 318. While not illustrated within FIG. 3B, the knowledge acquisition ontology, or any other ontology, may also be stored to the database 104, such as within the knowledge base 116.

The process 300 researches information technology solution candidates at block 320. At block 322, the process 300 scores information technology solution candidates and creates candidate scoring 324. The candidate scoring 324 may be stored to the database 104 within the knowledge base 116.

At block 326, the process 300 starts and/or modifies an information technology solution project. The process 300 makes a determination at decision point 328 whether to process the current solution. If a determination is made not to process the current version of the information technology solution, the process 300 continues to update the possibility context 316 at block 330. At block 332, the process 300 weights the scoring information at iterates back to block 318 to modify the knowledge acquisition ontology. When a determination is made at decision point 328 to process the solution, the process 300 transitions to perform operations illustrated within FIG. 3C.

Figure 3C:
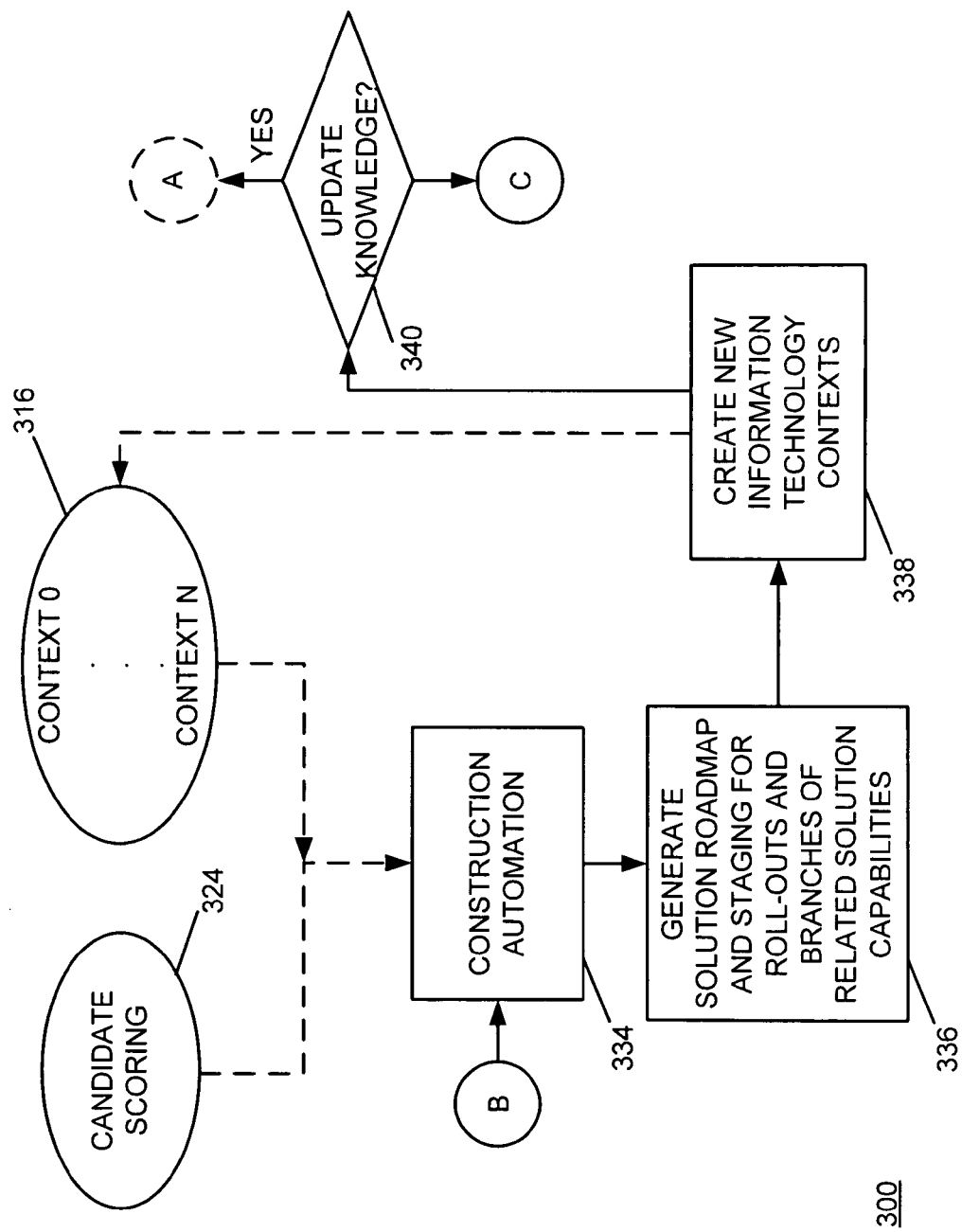
FIG. 3C illustrates a third portion of a flow chart of an example of an implementation of an automated solution generation process that may be executed within an IT solution development system for adaptive IT solution design and deployment according to an embodiment of the present subject matter.

FIG. 3C illustrates additional processing associated with the automated solution generation process 300 for construction automation. At block 334, the process 300 takes the candidate scoring 324 and the possibility context 316 as input and activates construction automation within the IT solution development system 100. The process 300 generates a solution roadmap and staging for roll-outs and branches of related solution capabilities at block 336. The process 300 creates new technology contexts at block 338 and updates the possibility context 316. The process 300 makes a determination at decision point 340 as to whether to return to block 318 in FIG. 3B to iterate and modify the knowledge ontology and the selected solution or to continue with processing for automated deployment. When the process 300 determines to return to modify the knowledge ontology and the selected solution, the process returns to block 318 and iteratively refines the knowledge ontology and the selected solution. When the process 300 determines to process the solution with automated deployment, the process 300 transitions to perform operations illustrated within FIG. 3D.

Figure 3D:
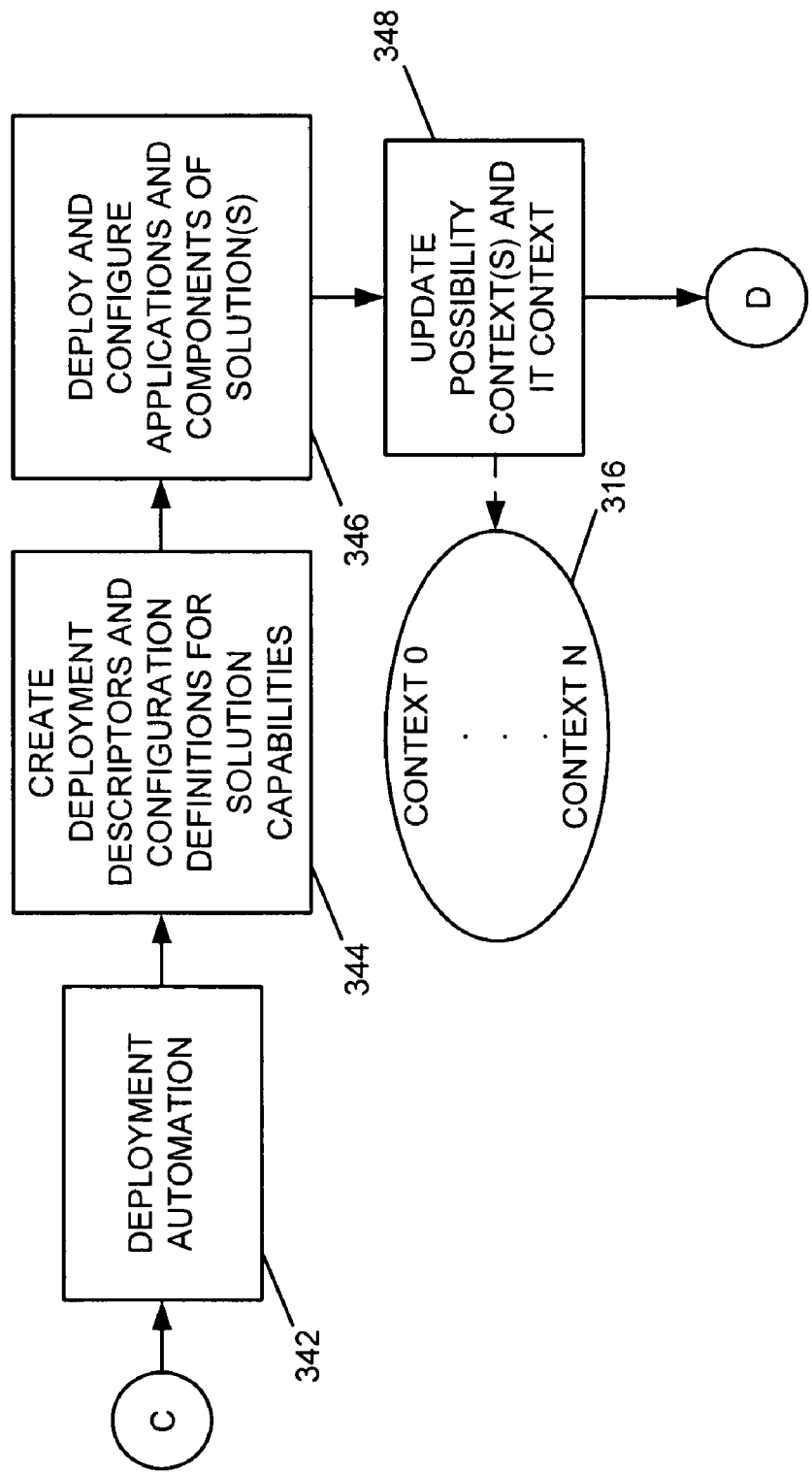
FIG. 3D illustrates a fourth portion of a flow chart of an example of an implementation of an automated solution generation process that may be executed within an IT solution development system for adaptive IT solution design and deployment according to an embodiment of the present subject matter.

FIG. 3D illustrates additional processing associated with the automated solution generation process 300 for deployment automation. The process 300 begins deployment automation at block 342. At block 344, the process 300 creates deployment descriptors and configuration descriptors for solution capabilities. The process 300 deploys and configures applications and components of the selected solution at block 346 and updates the possibility context 316 at block 348. The process 300 transitions to perform operations illustrated within FIG. 3E.

Figure 3E:
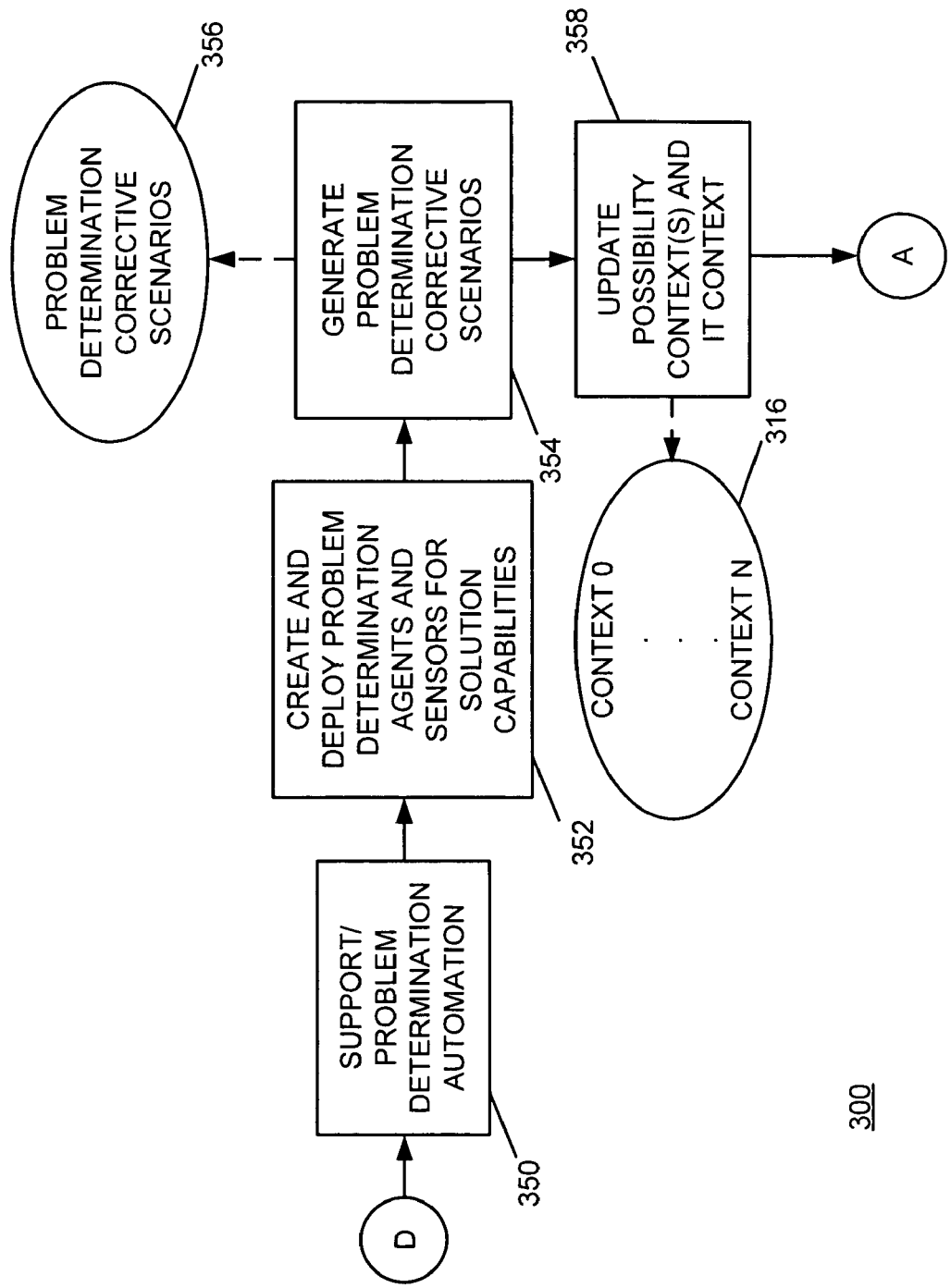
FIG. 3E illustrates a fifth portion of a flow chart of an example of an implementation of an automated solution generation process that may be executed within an IT solution development system for adaptive IT solution design and deployment according to an embodiment of the present subject matter.

FIG. 3E illustrates additional processing associated with the automated solution generation process 300 for problem support and determination automation. At block 350, the process 300 begins problem support and determination automation. The process 300 creates and deploys problem determination agents and sensors for solution capabilities at block 352. At block 354, the process 300 generates problem determination corrective scenarios 356. As with other data generated by the process 300, the determination corrective scenarios 356 may be stored to the database 104 within the knowledge base 116. The process 300 updates the possibility context 316 at block 358 and returns to block 318 in FIG. 3B to iterate and modify the knowledge ontology and the selected solution or to continue with processing for automated deployment. Accordingly, the process 300 provides multiple feedback paths for automated IT solution generation, construction, deployment, and problem identification and prediction.

Figure 4A:
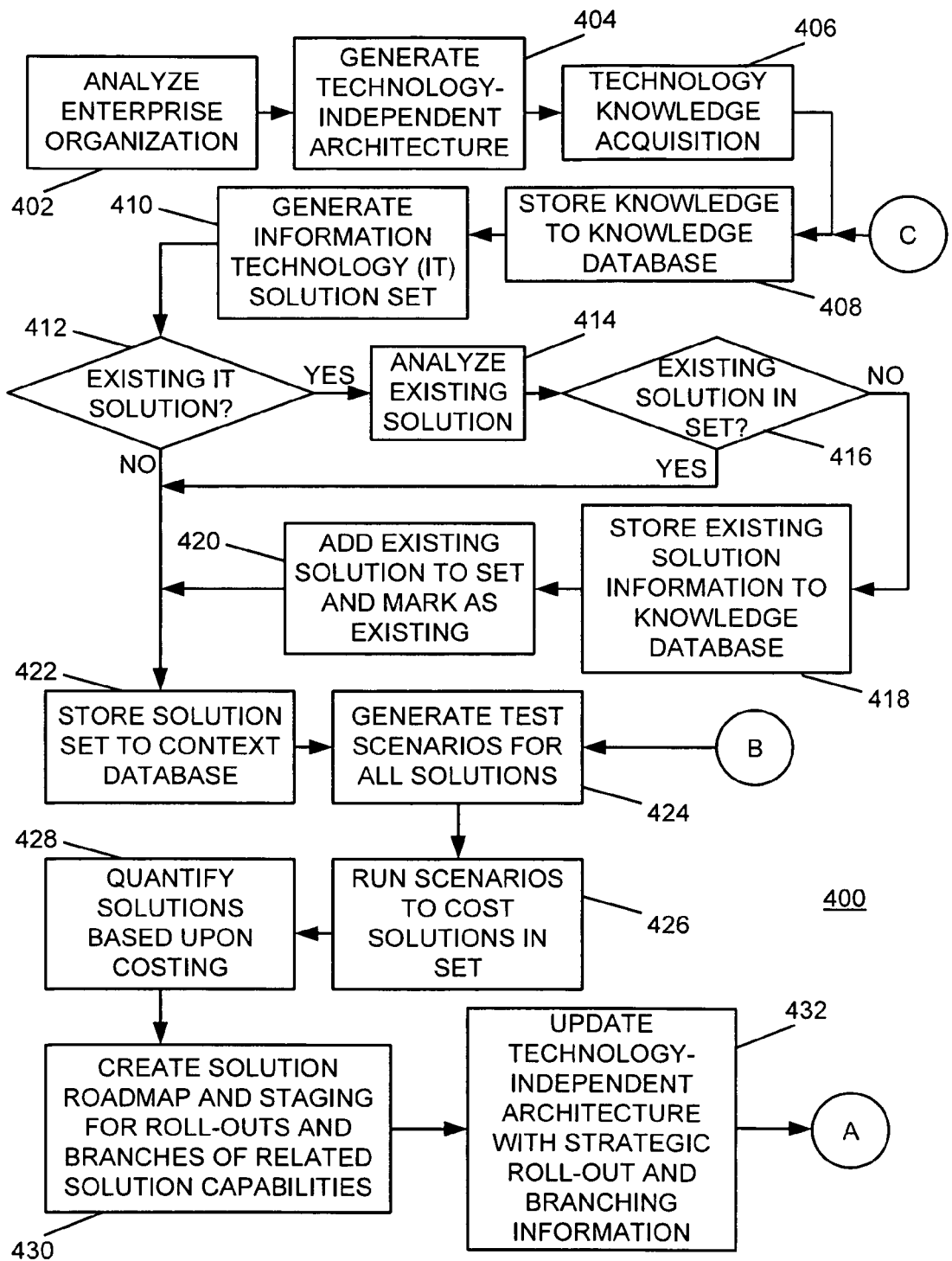
FIG. 4A illustrates a first portion of a flow chart of an example of an alternative implementation of an automated solution generation process that may be executed within an IT solution development system for adaptive IT solution design and deployment according to an embodiment of the present subject matter.
Figure 4B:
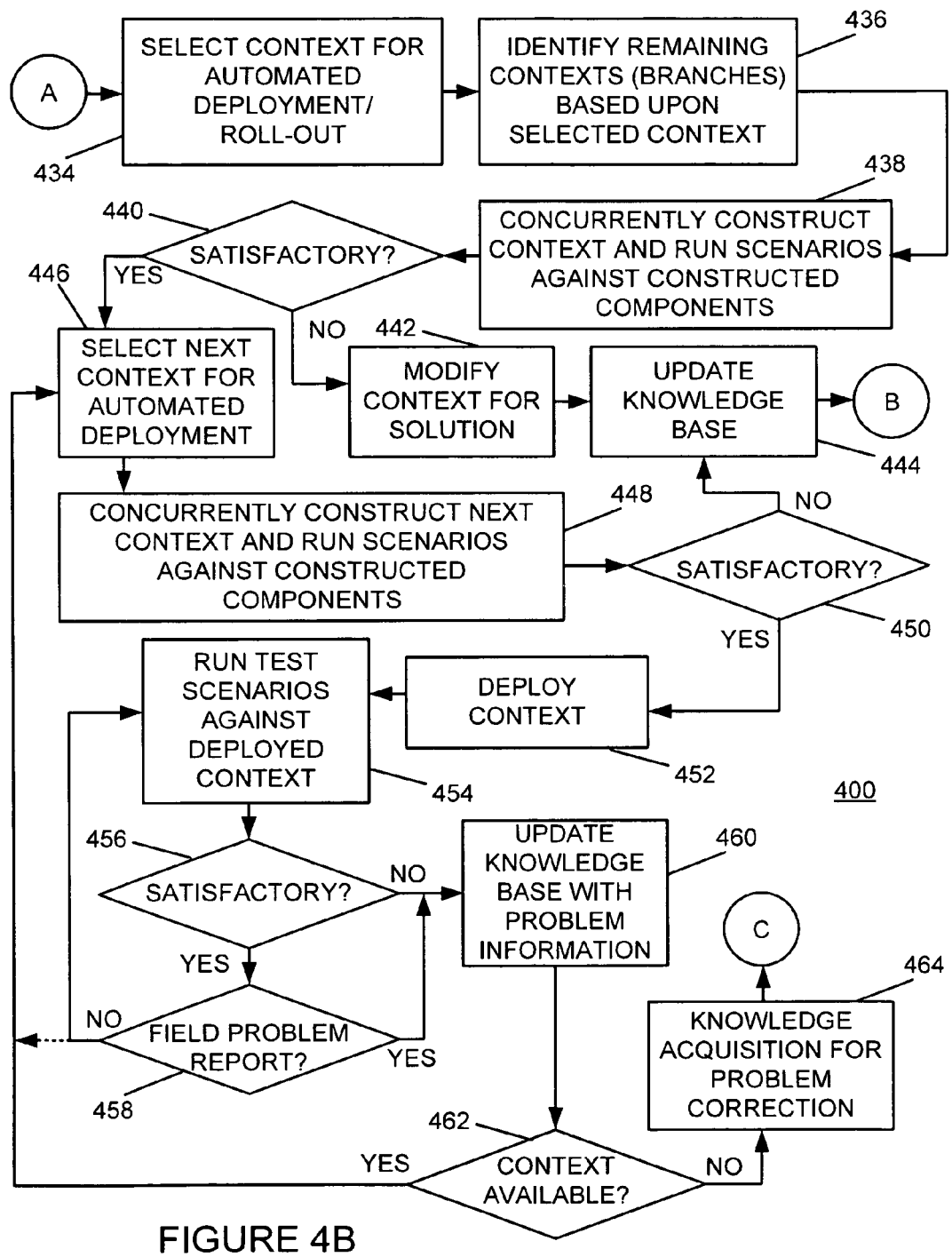
FIG. 4B illustrates a second portion of a flow chart of an example of an alternative implementation of an automated solution generation process that may be executed within an IT solution development system for adaptive IT solution design and deployment according to an embodiment of the present subject matter.

FIGS. 4A-4B illustrate a flow chart of an example of an alternative implementation of an automated solution generation process 400 that may be executed within the IT solution development system 100 for adaptive IT solution design and deployment according to the present subject matter. FIG. 4A illustrates example process elements of the automated solution generation process 400 for knowledge acquisition and construction automation, while FIG. 4B illustrates example process elements of the automated solution generation process 400 for automated deployment, problem prediction, and problem identification.

Within FIG. 4A, the process 400 analyzes an enterprise organization at block 402. At block 404, the process 400 generates a technology-independent architecture, such as the architecture 106 of FIG. 1. The process 400 performs technology knowledge acquisition at block 406 and stores knowledge gained to a knowledge base, such as the knowledge base 116, at block 408. At block 410, the process 400 generates an information technology solution set, such as the set of possibility contexts 120.

At decision point 412, the process 400 determines whether there is an existing IT solution. An IT solution may already exist when the enterprise organization has IT solution components in place or if an IT solution was generated during a previous iteration of the process 400. If a determination is made that an IT solution exists, that IT solution is analyzed at block 414.

At decision point 416, a determination is made as to whether the existing IT solution is already within the generated information technology solution set. If the existing IT solution is not found within the generated information technology solution set, the process 400 stores the existing IT solution to the knowledge base 116 at block 418. At block 420, the process 400 adds the existing solution to the information technology solution set and marks the existing solution to distinguish it from other potential solutions within the information technology solution set. When the process 400 completes processing of the existing solution at block 420 or determines that the existing solution is already within the information technology solution set at decision point 416, the process 400 stores the information technology solution set to a context database, such as the context base 118, at block 422.

The process 422 generates test scenarios for all solutions at block 424. The test scenarios may include any processes for determining efficiency, deployment cost, expected life, and any other factors that may assist with analysis of the information technology solution set. At block 426, the process 400 runs the generated test scenarios against solutions within the information technology solution set to cost and/or differentiate the solutions in the information technology solution set. The process 400 quantifies the solutions within the information technology solution set based upon the costing analysis at block 428.

At block 430, the process 400 creates a solution deployment strategy including a solution roadmap and staging for roll-outs and branches of related solution capabilities. The process 400 updates the technology independent architecture with the strategic roll-out and branching information at block 432. The process 400 transitions to perform operations illustrated within FIG. 4B.

FIG. 4B illustrates additional processing of the automated solution generation process 400 associated with automated deployment, problem prediction, and problem identification for an IT solution. At block 434, the process 400 selects a context for automated deployment and roll-out. The process 400 identifies remaining branches and branch possibilities for remaining contexts based upon the selected context at block 436. At block 438, the process 400 concurrently constructs the selected context and runs the generated test scenarios against constructed components to predict problems that may arise during deployment.

At decision point 440, the process 400 determines whether the constructed components are satisfactory based upon the executed test scenarios. If the process 400 determines that the constructed components are not satisfactory, it modifies the context for the solution at block 442, updates the knowledge base at block 444, and returns to block 424 in FIG. 4A to iteratively improve the IT solution result.

When the process 400 determines that the constructed components are satisfactory based upon the executed test scenarios, it selects the next context from the information technology solution set for automated deployment at block 446. At block 448, the process 400 concurrently constructs the next context and runs test scenarios against constructed components to predict problems that may arise during deployment.

At decision point 450, the process 400 determines whether the constructed components are satisfactory based upon the executed test scenarios. If the process 400 determines that the constructed components are not satisfactory, it updates the knowledge base at block 444, and returns to block 424 in FIG. 4A to iteratively improve the IT solution result.

When the process 400 determines that the constructed components are satisfactory based upon the executed test scenarios, it automatically deploys the constructed context at block 452. At block 454, the process 400 runs the test scenarios against the deployed context to identify any problems with the deployed context.

At decision point 456, the process 400 determines whether the deployed components are satisfactory based upon the executed test scenarios. If the process 400 determines that the deployed components are satisfactory based upon the executed test scenarios, it determines whether there have been any field problem reports at decision point 458.

If there are additional contexts to deploy, the process 400 may return to block 446 to select the next context for automated deployment. When all contexts have been deployed, the process 400 iterates between executing test scenarios at block 454, and determining whether the test results are satisfactory or whether there have been any field problem reports at decision points 456 and 458, respectively.

When the process 400 determines either that test results are not satisfactory at decision point 456 or that there have been field problem reports at decision point 458, it updates the knowledge base 116 with problem information at block 460. At decision point 462, the process 400 determines whether an existing context is available that has been previously identified to correct the predicted or identified problem. If the process 400 determines that an existing context is available, the process returns to block 446 and selects that existing context. If the process 400 determines that an existing context is not available, the process performs knowledge acquisition for problem correction at block 464 and returns to block 408 in FIG. 4A to store the knowledge gained to the knowledge base 116, and iterates to generate, construct, and deploy a suitable information technology solution.

In this manner, the process 400 iteratively operates to implement new and improved IT solutions based upon predicted or identified problems. By incrementally selecting, constructing, deploying, and testing IT solution elements, the process 400 adaptively evolves a selected IT solution from common components and allows late binding of decisions to facilitate changing and evolving requirements. It should be noted that contexts may be evolved by iteratively executing elements within the process 400 until an IT solution is suitable for deployment. Furthermore, an existing IT solution may be input to the process 400 to identify new alternatives and improvements to the existing IT solution.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   generating a plurality of information technology solution alternatives for an enterprise organization;
   evaluating the plurality of information technology solution alternatives within an automated architectural framework based upon at least one information technology evaluation metric;
   creating an automated incremental solution deployment strategy based upon the evaluated plurality of information technology solution alternatives; and
   selecting an information technology solution from the plurality of information technology solution alternatives for deployment based upon the automated incremental solution deployment strategy.

2. The method of claim 1 further comprising generating a technology-independent component and a technology-dependent component within the automated architectural framework.

3. The method of claim 2 wherein evaluating the plurality of information technology solution alternatives within the automated architectural framework based upon at least one information technology evaluation metric further comprises evaluating the at least one information technology evaluation metric based upon at least one of the technology-independent component and the technology-dependent component.

4. The method of claim 1 further comprising:
   generating at least one test scenario associated with the at least one information technology evaluation metric; and
   executing the at least one test scenario against the plurality of information technology solution alternatives within the automated architectural framework to differentiate the plurality of information technology solution alternatives; and
   wherein selecting the information technology solution further comprises selecting the information technology solution based upon the differentiated plurality of information technology solution alternatives.

5. The method of claim 1 further comprising identifying common components capable of supporting at least a portion of the plurality of information technology solution alternatives, constructing the common components, and wherein selecting the information technology solution further comprises selecting the information technology solution based upon evaluation of the constructed common components.

6. The method of claim 1 further comprising identifying at least one of a predicted problem and an actual problem, wherein the predicted problem is based upon further evaluation of the plurality of information technology solution alternatives within the automated architectural framework and the actual problem is based upon evaluation of a deployment of the selected information technology solution.

7. The method of claim 6 further comprising providing at least one of the predicted problem and the actual problem as feedback and updating the plurality of information technology solution alternatives based upon the feedback.

8. A system, comprising:
a database that stores an automated architectural framework;
a knowledge acquisition module adapted to:
generate a plurality of information technology solution alternatives for an enterprise organization; and
evaluate the plurality of information technology solution alternatives within the automated architectural framework based upon at least one information technology evaluation metric;
a construction automation module adapted to:
create an automated incremental solution deployment strategy based upon the evaluated plurality of information technology solution alternatives; and
select an information technology solution from the plurality of information technology solution alternatives for deployment based upon the automated incremental solution deployment strategy; and
a deployment automation module adapted to deploy the selected information technology solution.

9. The system of claim 8 wherein the knowledge acquisition module is further adapted to generate a technology-independent component and a technology-dependent component within the automated architectural framework.

10. The system of claim 9 wherein the knowledge acquisition module is further adapted to evaluate the at least one information technology evaluation metric based upon at least one of the technology-independent component and the technology-dependent component.

11. The system of claim 8, wherein:
the knowledge acquisition module is further adapted to generate at least one test scenario associated with the at least one information technology evaluation metric; and
the construction automation module is further adapted to:
execute the at least one test scenario against the plurality of information technology solution alternatives within the automated architectural framework to differentiate the plurality of information technology solution alternatives; and
select the selected information technology solution based upon the differentiated plurality of information technology solution alternatives.

12. The system of claim 8 wherein the construction automation module is further adapted to identify common components capable of supporting at least a portion of the plurality of information technology solution alternatives, construct the common components, and select the selected information technology solution based upon evaluation of the constructed common components.

13. The system of claim 8 further comprising a support and problem determination automation module adapted to identify at least one of a predicted problem and an actual problem, wherein the predicted problem is based upon further evaluation of the plurality of information technology solution alternatives within the automated architectural framework and the actual problem is based upon evaluation of the deployed information technology solution.

14. The system of claim 13 wherein the support and problem determination automation module is further adapted to provide at least one of the predicted problem and the actual problem as feedback and wherein the knowledge acquisition module is further adapted to update the plurality of information technology solution alternatives based upon the feedback.

15. A system comprising:
a database that stores an automated architectural framework, a knowledge base, and a context base; and
a process module comprising:
a knowledge acquisition module adapted to:
generate a plurality of information technology solution alternatives for an enterprise organization;
store the plurality of information technology solution alternatives to the knowledge base within the database;
evaluate the plurality of information technology solution alternatives within the automated architectural framework based upon at least one information technology evaluation metric; and
update the plurality of information technology solution alternatives for the enterprise organization based upon feedback;
a construction automation module adapted to:
create an automated incremental solution deployment strategy based upon the evaluated plurality of information technology solution alternatives;
store the automated incremental solution deployment strategy to the context base within the database; and
select an information technology solution from the plurality of information technology solution alternatives for deployment based upon the automated incremental solution deployment strategy;
a deployment automation module adapted to deploy the selected information technology solution based upon the automated incremental solution deployment strategy; and
a support and problem determination automation module adapted to:
identify at least one of a predicted problem and an actual problem, wherein the predicted problem is based upon further evaluation of the plurality of information technology solution alternatives within the automated architectural framework and the actual problem is based upon evaluation of the deployed information technology solution; and
provide at least one of the predicted problem and the actual problem as the feedback to the knowledge acquisition module.

16. A computer program product comprising a computer useable storage medium including a computer readable program, wherein the computer readable program when executed on a computer causes the computer to:
generate a plurality of information technology solution alternatives for an enterprise organization;

evaluate the plurality of information technology solution alternatives within an automated architectural framework based upon at least one information technology evaluation metric;

create an automated incremental solution deployment strategy based upon the evaluated plurality of information technology solution alternatives; and select an information technology solution from the plurality of information technology solution alternatives for deployment based upon the automated incremental solution deployment strategy.

17. The computer program product of claim 16, wherein the computer readable program when executed on a computer further causes the computer to generate a technology-independent component and a technology-dependent component within the automated architectural framework.

18. The computer program product of claim 17, wherein the computer readable program when executed on a computer further causes the computer to evaluate the at least one information technology evaluation metric based upon at least one of the technology-independent component and the technology-dependent component.

19. The computer program product of claim 16, wherein the computer readable program when executed on a computer further causes the computer to:

generate at least one test scenario associated with the at least one information technology evaluation metric;

execute at least one test scenario against the plurality of information technology solution alternatives within the automated architectural framework to differentiate the plurality of information technology solution alternatives; and to further select the selected information technology solution based upon the differentiated plurality of information technology solution alternatives.

20. The computer program product of claim 16, wherein the computer readable program when executed on a computer further causes the computer to identify common components capable of supporting at least a portion of the plurality of information technology solution alternatives, construct the common components, and to further select the selected information technology solution based upon evaluation of the constructed common components.

21. The computer program product of claim 16, wherein the computer readable program when executed on a computer further causes the computer to identify at least one of a predicted problem and an actual problem, wherein the predicted problem is based upon further evaluation of the plurality of information technology solution alternatives within the automated architectural framework and the actual problem is based upon evaluation of a deployment of the selected information technology solution, and to provide at least one of the predicted problem and the actual problem as feedback to update the plurality of information technology solution alternatives.

* * * * *